May 19, 1970 H. MULLER 3,513,255

CONTROL SIGNALS FOR USE WITH TELETYPEWRITER APPARATUS

Filed Aug. 24, 1967 7 Sheets-Sheet 1

May 19, 1970 H. MULLER 3,513,255

CONTROL SIGNALS FOR USE WITH TELETYPEWRITER APPARATUS

Filed Aug. 24, 1967 7 Sheets-Sheet 2

May 19, 1970 H. MULLER 3,513,255

CONTROL SIGNALS FOR USE WITH TELETYPEWRITER APPARATUS

Filed Aug. 24, 1967 7 Sheets-Sheet 4

May 19, 1970 H. MULLER 3,513,255

CONTROL SIGNALS FOR USE WITH TELETYPEWRITER APPARATUS

Filed Aug. 24, 1967 7 Sheets-Sheet 5

May 19, 1970 H. MULLER 3,513,255

CONTROL SIGNALS FOR USE WITH TELETYPEWRITER APPARATUS

Filed Aug. 24, 1967

7 Sheets-Sheet 7

United States Patent Office 3,513,255
Patented May 19, 1970

3,513,255
CONTROL SIGNALS FOR USE WITH TELETYPEWRITER APPARATUS
Henrik Muller, 5 Nonnenhornstrasse, 8 Munich 60, Germany
Filed Aug. 24, 1967, Ser. No. 663,081
Claims priority, application Germany, Aug. 25, 1966, S 105,518
Int. Cl. G08c 19/22
U.S. Cl. 178—2 13 Claims

ABSTRACT OF THE DISCLOSURE

A circuit wherein additional stations may be connected to an existing connection between a calling subscriber station and a called subscriber station. Clearing signals are employed to effect connection of desired additional subscriber stations to the existing connection. Additional subscriber stations can be connected to the existing connection without requiring the calling or called subscriber station that requests their connection to the existing connection to provide separate entry control signals. Each additional subscriber station comprises means to effect a connection to the existing connection, if a clearing signal is received which is indicative of a request by one of the connected subscriber stations that a particular additional station be connected to the existing connection.

CROSS-REFERENCE TO RELATED APPLICATION

Applicant claims priority from corresponding German application Ser. No. S 105,518, filed Aug. 25, 1966, in Germany.

BACKGROUND OF THE INVENTION

Field of the invention

The invention relates to apparatus comprising a calling station connected to a called station, and more particularly, to apparatus that may be employed to connect other stations to the existing connection. It has particular utility in teletypewriter systems.

State of the prior art

Prior art teletypewriter systems provide apparatus to connect an additional subscriber station to an existing connection between a calling subscriber station and a called subscriber station, if either the calling or called subscriber so requests. For example, it may be desired to connect an additional station to an existing connection when, prior to the release of the existing connection, toll charges are to be charged to the calling subscriber. Another instance in which it is desired to connect an additional station to an existing connection is that in which it is desired to connect a third subscriber to the existing connection.

Prior art teletypewriter apparatus provide for the transmission of special entry signals that normally comprise specific text or letter configurations, that must be evaluated by the additional stations (hereinafter also referred to as entry stations) to effect connection thereof to the existing connection. Such teletypewriter apparatus thereby requires additional servicing, special evaluation switching devices that normally comprise transformers, and special text evaluation switching devices. These extra components substantially increase the cost of teletypewriter apparatus as well as operational costs associated therewith, and complicate the interconnecting electrical circuit.

SUMMARY OF THE INVENTION

These and other defects of prior art systems are solved by this invention, which utilizes existing signal criteria to function as an entry signal for any exchange office connectable to the existing connection. The entry signal criteria is provided by transmission of a clearing signal by a subscriber connected to the existing connection, and is recognized and evaluated as entry criteria only by the exchange office associated with the entry station to be connected to the existing connection. At all other possible entry stations, the entry signal criteria is evaluated as a limited release signal that is insufficient to effect release of the existing connection. Thus, if the clearing signal is received by an exchange office for a predetermined period of time, control means are actuated to effect connection of the associated entry station to the existing connection. If, however, a release signal (of greater time duration than the clearing signal) is transmitted, release control apparatus is responsive to effect release of the existing connection.

If the entry station is to be connected to the receiving line associated with teletypewriter reception by a calling station, apparatus is employed to apply a signal that is inverted, with respect to the polarity of the signal produced by the clearing signal, to the calling station, after a predetermined period of time, to maintain the connection. After connection of the entry station has been effected, and the clearing signal is completed, said apparatus functions to return the existing connection to its normal state. Thus, release of the existing connection by the clearing signal is precluded.

If the entry station is to be connected to the transmission line associated with teletypewriter transmission by a calling station, apparatus associated with the entry station to be connected to the existing connection, functions to produce a corresponding signal in response to reception thereby of the clearing signal that maintains the existing connection until the entry station is connected thereto. These corresponding signals are transmitted to the exchange office or the entry station, which in turn produces acknowledgment signals that are evaluated by the entry station apparatus to ascertain if the clearing signal being received is an entry signal or a release signal.

Therefore, the invention provides for the connection of entry stations to either the transmission line or the receiving line associated with a calling station connected thereover to a called station, without the necessity that the calling or called stations transmit special entry control signals of the text configuration type, for example. Thus, the manufacturing cost of the teletypewriter apparatus is minimized because additional expensive supervision and evaluation apparatus need not be employed.

DETAILED DESCRIPTION OF THE INVENTION

Figure 1:
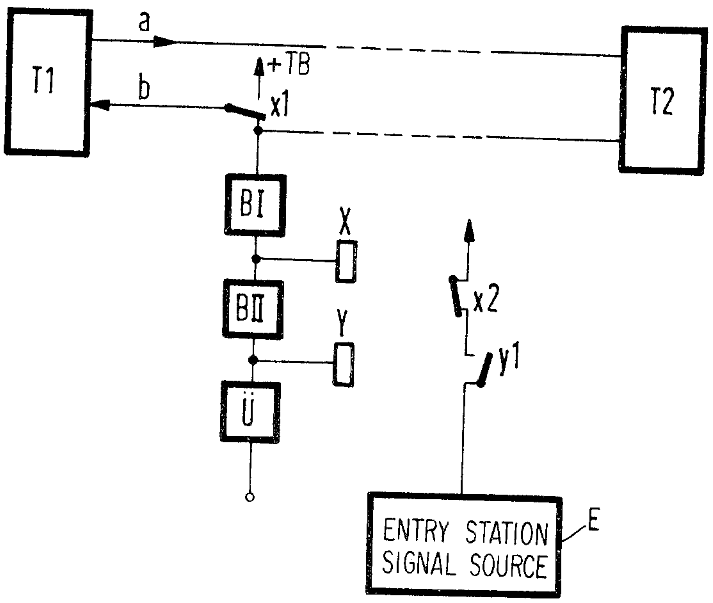
FIG. 1 is an electrical schematic diagram showing an entry station connectable to a connected station receiving line.

FIG. 1 shows the connections between calling station T1 and called station T2, wherein calling station T1 transmits signals to line *a*, and receives signals from line *b*. When calling station T1 is transmitting teletypewriter information to called station T2, or is receiving teletypewriter information from called station T2, contact *x*1 is normally closed and line *b* is connected through. If a clearing signal is produced, it produces a negative start polarity (—TB) signal that is transmitted to line *b* and is evaluated by time evaluation switching device BI. If the clearing signal is of time duration greater than time I, relay X is actuated and connects contact *x*1 to the stop polarity source (+TB), and +TB is thereby transmitted to the calling station T1 and the exchange station (not shown) of the entry station over line *b*. The exchange station would normally effect release of the existing connection between the called and calling stations when a release signal of greater time duration than the clearing signal is received thereby. However, the exchange office receives only a start polarity signal (—TB) of relatively short time duration because actuation of relay X causes a stop polarity signal (+TB) to be applied thereto, and release of the existing connection is thus not effected.

If the clearing signal is of time duration greater than time period II, time evaluation switching device BII functions to energize relay Y. Then, at the end of the clearing signal relay X is again deenergized, and contact *x*1 drops out and called station T2 is again connected to calling station T1 over line *b*, through closed contact *x*1, and contact *x*2 is actuated to the closed position. Energization of relay Y actuates contact *y*1 to the closed position. Thus, an entry signal may be transmitted by the entry signal source E to line *b* through the complete connection path comprising closed contacts *x*2 and *y*2. This functions to effect connection of the entry station to the existing connection.

The release of the existing connection between the calling station T1 and called station T2 is effected by supervision switching device U that is responsive to a release signal of start polarity (—TB) of predetermined time duration greater than time periods I or II to close contact *x*1. The release signal is thus applied again to the office exchange over line *b*, and functions to control conventional apparatus (not shown) to effect release of the existing connection.

The release of a connection between a given calling station and a given called station is controlled by the exchange office assigned to the calling station. Therefore, an entry station requested to be connected to the existing connection by a called station, can be connected at any point in line *b*.

If the calling station requests that a particular station be connected to the existing connection, this is effected by transmission of a clearing signal over line *a*. This is a relatively simple process if the entry station is also assigned to the starting exchange office to which the calling station is assigned. This is illustrated in FIG. 2.

Figure 2:
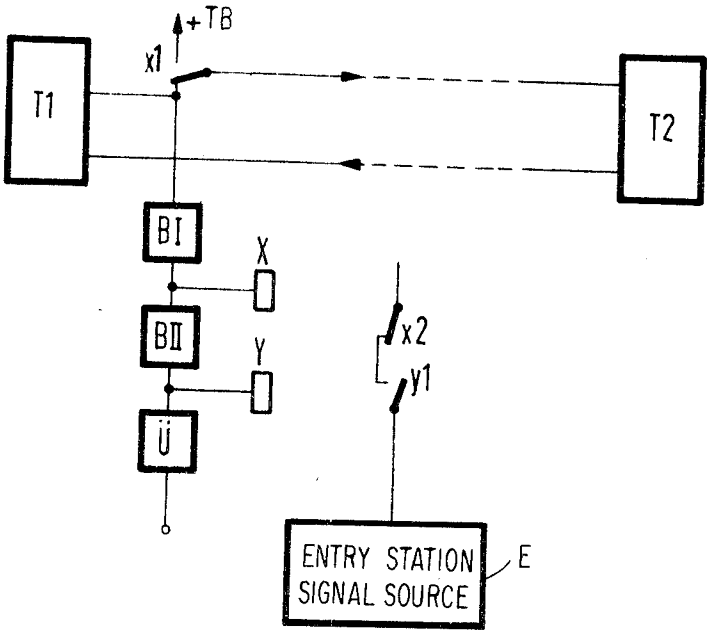
FIG. 2 is an electrical schematic diagram showing an entry station connectable to a connected station transmission line.

FIG. 2 shows a connection between calling station T1 and called station T2. Time evaluation switching devices BI and BII again evaluate the time duration of a clearing signal, with switching device BI providing an output to actuate relay X when the clearing signal is of time duration of time period I, and switching device BII producing an output to actuate relay Y when the clearing signal is of time duration of time period II. Depending upon the evaluation of the clearing signal, relays X and Y are both actuated, or relay X is only actuated, or neither of relays X and Y is actuated.

It is seen that line *a* may be broken by contact *x*1. When teletypwriter information is being transmitted from calling station T1 to called station T2, contact *x*1 is closed, and a through connection exists over line *a*. If a clearing signal is transmitted by calling station T1 of time duration I, relay X is actuated in response to time evaluation switching means BI, and functions to open contact *x*1 and connect station T2 to the source of stop polarity potential (+TB). This functions to maintain the existing connection until the entry station is connected in. Simultaneously, contact *x*2 associated with relay X is actuated, to the open position. If the clearing signal is of time duration II, relay Y is actuated in response to the time evaluation made by time evaluation switching device BII, and functions to actuate contact *y*1 to the closed position. At termination of the clearing signal transmitted by calling station T1, stop polarity potential (+TB) is applied by calling station T1 to line *a* and relay X is thus deenergized. Contact *x*1 closes in response to deenergization of relay X and a through connection is established between calling station T1 and called station T2. Further, deenergization of relay X causes contact *x*2 to be actuated to the closed position, and an entry signal may then be transmitted to line *a* over the complete connection existing between the source of entry signals E and line *a*, over closed contacts *y*1 and *x*2. Thus, the normal through connection between calling station T1 and called station T2 is reestablished.

Therefore, it is seen that since contact *x*1 is actuated to the positive polarity source (stop polarity +TB) after a clearing signal of time duration greater than time I is transmitted, the start polarity —TB signal produced by the clearing signal is, in effect, intercepted in the forward direction between calling station T1 and called station T2 and applied to evaluation apparatus comprising evaluation switching devices BI and BII, and supervision switching device U, which determines if it is an entry signal, and if it is, does not effect release of the existing connection. However, if after time period II, the received signal is evaluated to be a release signal, release of the existing connection is effected by conventional apparatus not shown, under the control of the exchange office of the called station.

Figure 3:
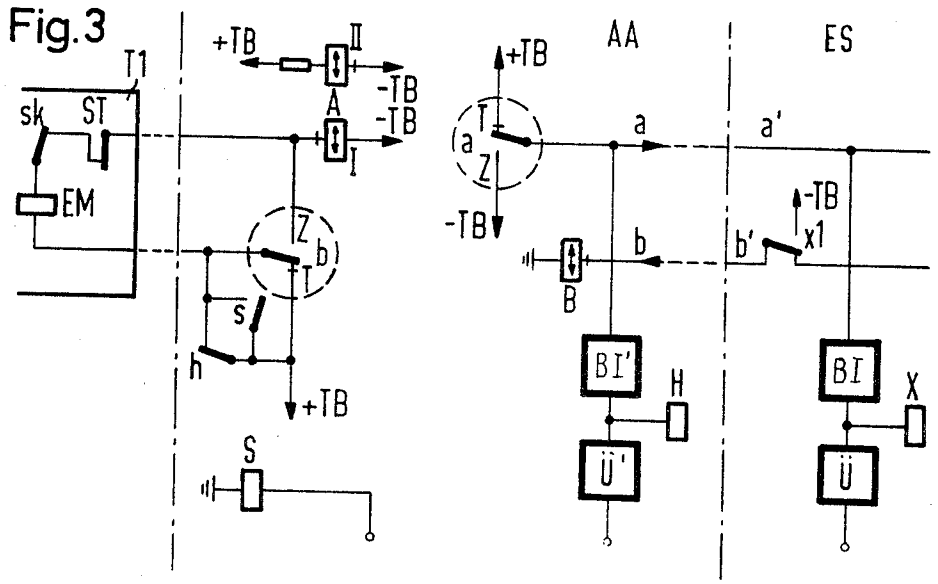
FIG. 3 is an electrical schematic diagram showing the utilization of a clearing signal to develop entry signal criteria for an entry station connectable to a local or 2-wire communication line.

If the entry station to be connected to the existing connection at the request of the calling station is any exchange office within the connection and, if, the clearing signal is also used as an entry signal, an arrangement of the type illustrated in FIG. 3 may be used.

In FIG. 3, conventional teletypewriter apparatus at station T1 comprising transmission contact *sk*, receiver means EM, and clearing signal key ST, is connected to called station T2. Starting exchange office AA is assigned to the calling station T1 and comprises telegraph relays A and B having transmission contact *a* and receiving contact *b*, respectively. The entry station designated ES, may be connected to any part of the connection comprising lines *a* and *b*, and for illustrative purposes, is shown as connectable to line *a* over line *a'*.

Further, in accordance with the invention, the exchange office AA also comprises relay S that may be selectively energized by a subscriber station that desires the connection of an entry station. Contact *s* is actuated in response to energization of relay S to provide an alternative hold connection for the circuit of the exchange office assigned to calling station T1, when clear key ST of calling station T1 is actuated and contact *h* is thus opened. In this regard, relay H of the exchange office controls the operation of contact *h* in response to the evaluation of signals present on line *a*, and in conjunction with supervision device U, controls release of the existing connection when release criteria is evaluated.

Figure 4:
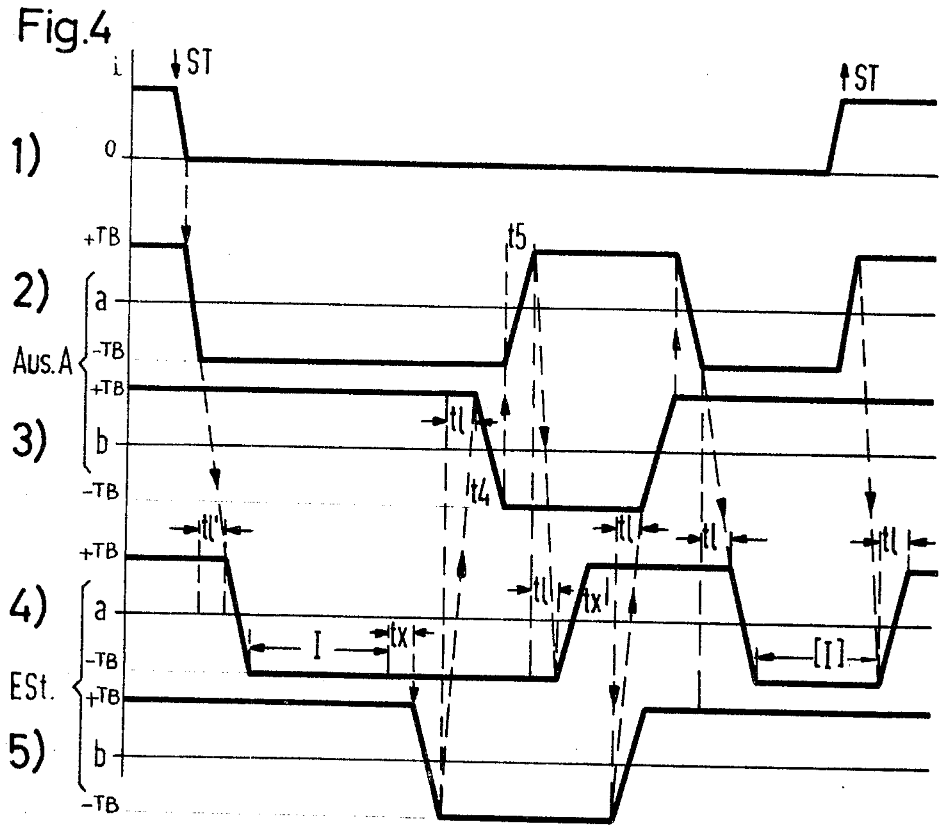
FIG. 4 is a series of five graphs (1–5) which show the signal conditions with respect to time that exist in variout parts of the circuit illustrated in FIG. 3.

FIG. 4 illustrates the signals present at various parts of the circuit illustrated in FIG. 3, when a clearing signal is produced by calling station T1. When clearing key ST is actuated, the loop connection between —TB and +TB, through contact ST, contact *sk*, receiving means EM, and contact *h*, is broken. Therefore, relay A is deenergized and this reroutes contact *a* to contact position with associated contact Z (the signal position). Therefore, line *a* is connected to start polarity potential (—TB). This is illustrated in FIG. 4, wherein Graph 1 shows that the described loop is interrupted and the signals therein decrease to zero, while the potential of line *a* goes negative to —TB (Graph 2).

Further, stop polarity (+TB) is applied by called station T2 (not shown) to relay B, and therefore actuates contact *b* to its separation position wherein it is connected to associated contact T. Therefore, contact *b* is maintained in the position illustrated in FIG. 3. Therefore, relay A is energized (over winding II thereof, as is conventional) such as to maintain the signal position connection of contact *a*, wherein contact *a* is connected to associated contact Z.

After a time delay *t*1 (depending upon the length of line *a*), the start polarity signal (—TB) is received by entry station ES through line *a'* (Graph 4) and is evaluated by time evaluation switching device B, which functions to energize relay X after the start polarity (—TB) signal is received for time period I. Contact *x*1 is thus actuated to effect a connection to the start polarity source (—TB), which is then transmitted to relay B over lines *b'* and *b*. Time delay *t*1 is also associated with signal transmission over line *b*.

It is understood, of course, that contact *s* of relay S, is actuated to the closed position by conventional apparatus (not shown), in response to a connected subscriber's request that an entry station be connected to the existing connection. Energization of relay B by —TB, actuates contact *b* to signal position (wherein it is connected to associated contact Z), and energizes relay A such that it actuates contact *a* to its separation position (wherein it is connected to associated contact T) and thus stop polarity potential (+TB) is applied to line *a*, and after time delay *t*1, to line *a'*. This causes relay X to be deenergized, and contact *x*1 is actuated back to the closed position illustrated in FIG. 3. Thus, stop polarity potential (+TB) is again applied to relay B over lines *b'* and *b*, and contact *b* is actuated to its separation position wherein it is connected to associated contact T.

This interrupts the energizing circuit of relay A that maintains contact *a* in its separation position wherein it is connected to associated contact T, and causes contact *a* to be actuated to its signal position wherein it is connected to associated contact Z. Thus, start polarity potential (—TB) is again applied to line *a*, and after a predetermined time period *t*1, to line *a'*, and again functions, as heretofore explained, to activate relay X after it is received for time period I. In the event, and as illustrated by the graphs in FIG. 4, transmission of the clearing signal ST by calling station T1 is terminated, the described process is also terminated, before evaluation of the clearing signal by time evaluation switching device BI.

Thus, it is seen with reference to FIG. 4, that when the clearing signal ST is of time duration at least equal to time I, start polarity (—TB) potential is received and evaluated by entry station ES, and a start polarity (—TB) pulse is transmitted back to the exchange office AA. However, in the exchange office AA, the start polarity (—TB) is inverted and an acknowledgment signal pulse of stop polarity (+TB) is transmitted back to the entry station ES. Therefore, only an error-conditioned start polarity (—TB) signal is simulated for all connection supervision stations located within the connection. That is, the start polarity pulses (—TB) transmitted to and/or from the exchange office are of insufficient time duration to effect release of the existing connection.

If the time interval between reception of a start polarity (—TB) signal resulting from transmission of a clearing signal by the calling subscriber and a stop polarity (+TB) signal, by a station connected to the existing connection [wherein the stop polarity (+TB) signal is the acknowledgement by the exchange office of transmission thereto by entry station ES of the —TB pulse], is less than the minimum first and second signal clearing periods (I and II of connected stations, the connection to none of said connected stations will be released. In other words, if the sum of the maximum clearing signal period I of the entry station and twice the delay time *t*1 associated therewith, is less than the minimum first and second clearing signal time periods (I and II), no connection release will be effected at any station connected into the existing connection, and the entry station can enter into the existing connection. The actual connection apparatus is not shown in FIG. 3, but was described in relation to FIGS. 1 and 2 (note Relay Y). If a release signal is transmitted, the clearing signal criteria described will not be met, and therefore the existing connection will be broken. Also, it should be noted that the response time of the relays, especially relay X, must be taken into account. FIG. 4 illustrates the effect of the response time *tx* of relay X in relation to entry signal criteria. The conditions explained are available in most teletypewriter systems, and particularly in newer systems, wherein the time tolerances of relays and other elements are relatively narrow.

Thus, depending on the time periods I and II of each entry station, as determined by the location of the connection of its evaluation apparatus to the existing connection (upon which time delay *t*1 will depend), the clearing signal may be used to produce entry criteria to selectively connect the desired entry station to the existing connection, and to simultaneously avoid release of said existing connection, or any other stations connected thereto.

Figure 5:
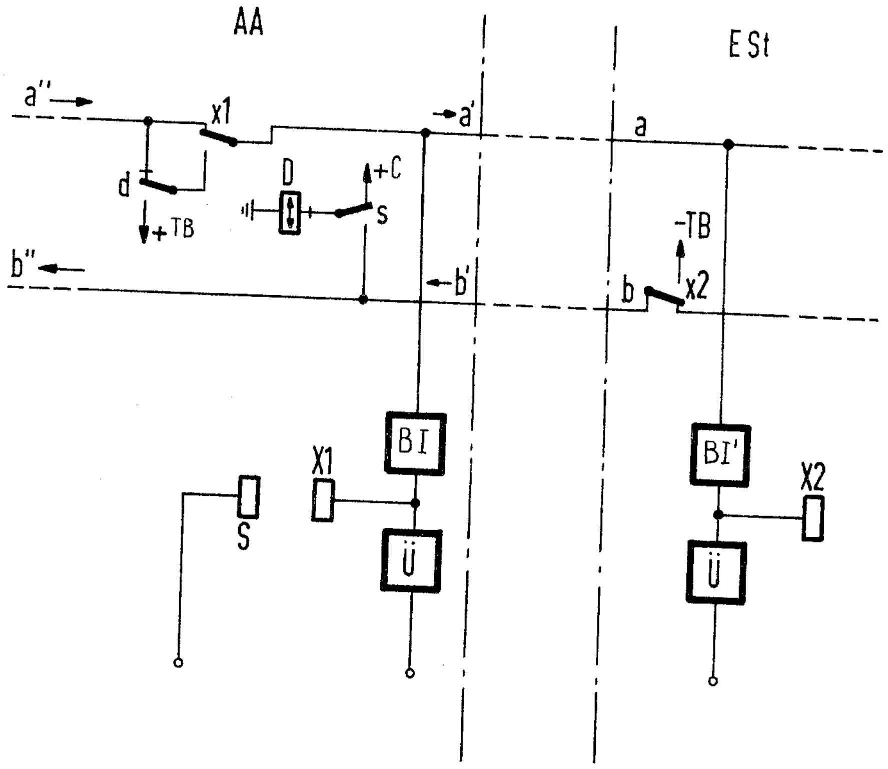
FIG. 5 is an electrical schematic diagram illustrating the utilization of clearing signals to develop entry signal criteria for an entry station connectable to a long distance or 4-wire communication line.

In the circuit illustrated in FIG. 3, it was assumed that the calling station (subscribed T1) is connected to the starting exchange office AA over a local or two-wire line. FIG. 5 shows an embodiment of the invention wherein the calling subscriber is connected to the starting exchange office AA over a long distance or four-wire line. Thus, the teletypewriter signals transmitted over line *a''* represent two current signals. Contact *s* at the starting exchange office AA is actuated to connection with line *b'* in response to an appropriate signal from calling station T1, as explained with reference to FIG. 3. This energizes relay D, and actuates contact *d* to connection with line *a''*.

Figure 6:
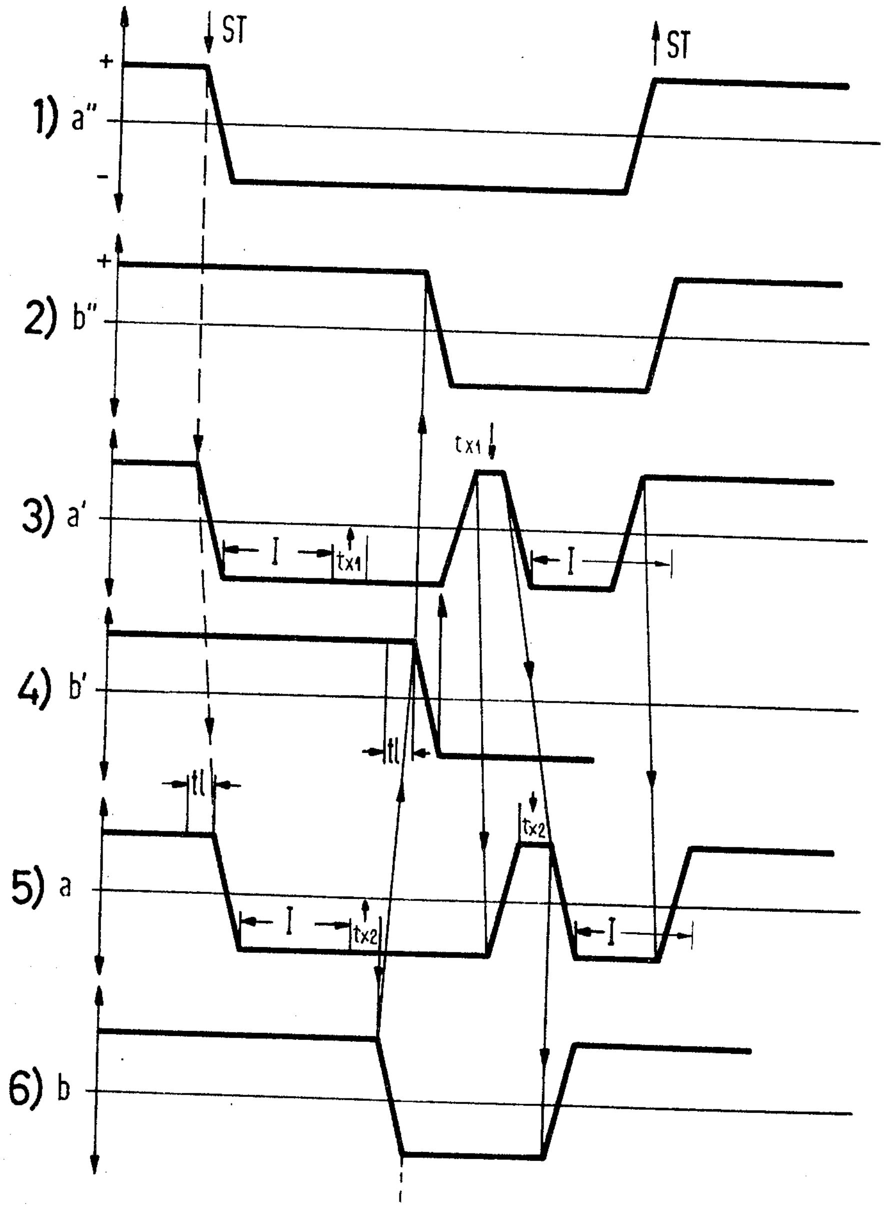
FIG. 6 is a series of six graphs (1–6), which show the signal conditions with respect to time that exist in various parts of the circuit illustrated in FIG. 5.

The entry station ES is similar to that described with relation to FIG. 3. FIG. 6 shows Graphs 1–6 that explain the operation of the circuit illustrated in FIG. 5.

Thus, when a clearing signal is produced by calling subscriber T1, start polarity (—TB) is applied to line *a''*, as illustrated in Graph 1 of FIG. 6. This is connected through contact *x*1 to connector *a'* (Graph 3) and, after predetermined time delay *t* 1, applied to connector *a* (Graph 5). Time evaluation switching device BI associated with starting exchange office AA evaluates the received signal and produces a control signal that energizes relay X1 after time I, to actuate contact *x*1 to connection with contact *d*. Further, time evaluation switching device B1' of entry station ES serves to energize relay X2 after the start polarity (—TB) signal has been received at the entry station (delayed by time *t*1 relative to exchange office AA) for a time period greater than I, and thereby actuates contact *x*2 to the position where it connects line *b* to start polarity (—TB). This is illustrated in Graph 6.

The start polarity (—TB) potential is applied to line *b'* from line *b*, after predetermined time delay *t*1 (Graph 4), and since contact *s* is also connected to line *b'*, start polarity (—TB) is also applied to relay D. Relay D is energized in response to energization by start polarity (—TB) to actuate contact *d* to connection with stop polarity (+TB).

This causes relay X, to be deenergized, and contact *x*1 is actuated to connection with line *a''*, and thereby again completes the connection between lines *a''* and *a'*, as shown in FIG. 5. It is therefore seen that the start polarity (—TB) that is transmitted by entry station ES over lines *b* and *b'* to the starting exchange office AA results in the transmission back to the entry station ES of a short stop polarity acknowledgement pulse (+TB) which is received at line *a* of entry station ES after predetermined time *t*1. In this regard, predetermined time *t*1 is the time delay associated with transmission of a signal between lines *a'* and *a*.

The reception of the stop polarity acknowledgment pulse (+TB) over line *a* deenergizes relay X2 which actuates contact *x*2 to the position shown in FIG. 5. wherein it provides a through connection between line *b* and line *b'*. Thus, as was described in relation to the circuit shown in FIG. 3, the start polarity (—TB) that is transmitted by entry station ES and is received by starting exchange office AA, is acknowledged by transmission by starting exchange office AA to entry station ES of a stop polarity (+TB) pulse over line *a*. For all connection supervision stations associated with the described connection, there thus results only a relatively short stop polarity (+TB) pulse, which is of insufficient time duration to effect release of any existing connections. Further, as long as a clearing signal is transmitted by a subscriber, a stop polarity (+TB) pulse is then again transmitted by entry station ES, after reception thereby of the acknowledgment pulse, and this is again acknowledged by office exchange AA as described above.

The generation of entry criteria at the entry station is initated by termination of clearing signal transmission by the calling subscriber. Then, instead of stop polarity pulses (+TB), a permanent stop polarity signal is received at entry station ES. In order to have a definite criteria for the entry station to recognize and evaluate whether a received stop polarity signal (+TB) results from completion of the clearing signal transmitted by the calling subscriber, rather than to other causes as for example, the transmission of a relatively short stop polarity acknowledgment pulse (+TB) by exchange office AA, the time evaluation switching device B1' at the entry station ES functions to evaluate the time interval between the transmission of a start polarity (—TB) pulse by entry station ES over line *b* to starting exchange office AA, and the reception of a stop polarity (+TB) pulse acknowledgment signal transmitted by exchange office AA. Thus, there are two criteria that must be evaluated in order to properly recognize a stop polarity (+TB) signal transmitted by a subscriber station, at the completion of clearing signal transmission, that may more fully be explained with reference to FIGS. 7*a* and 7*b*.

Figure 7A:
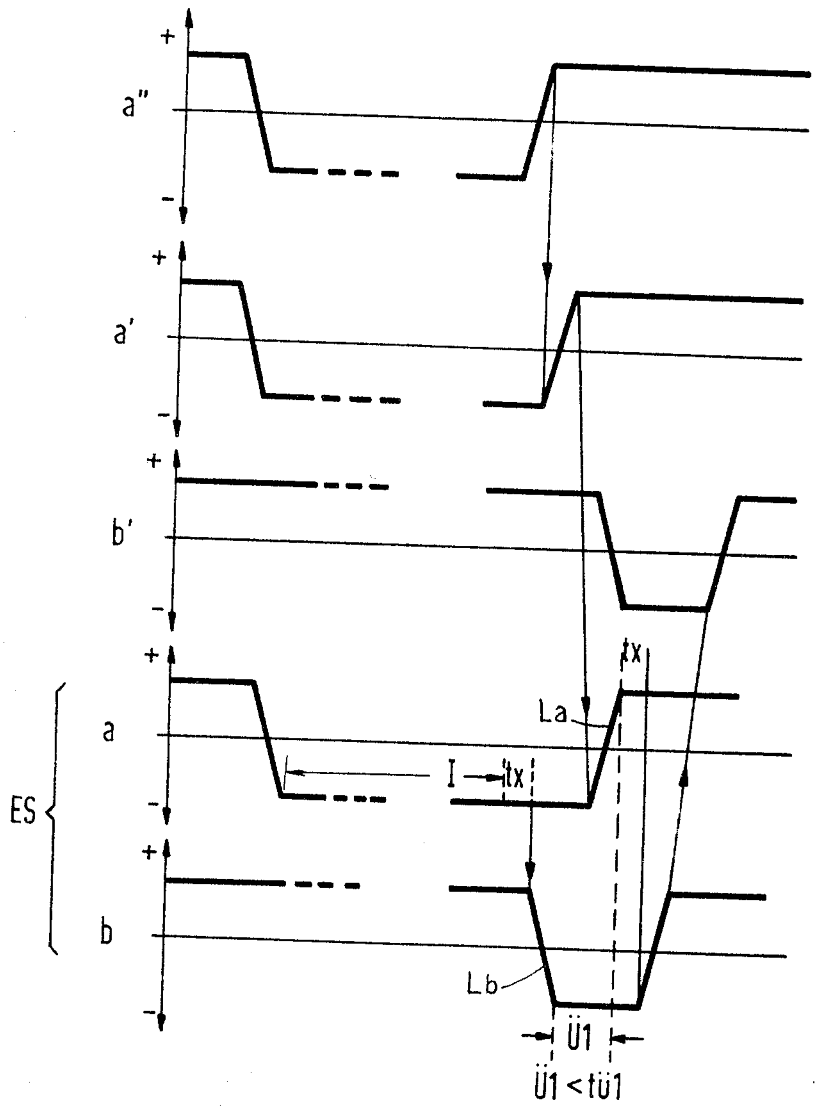
FIG. 7*a* is a series of graphs which explain one of the two time criteria utilized at an entry station to distinguish received clearing signals and develop accurate entry criteria therefrom.
Figure 7B:
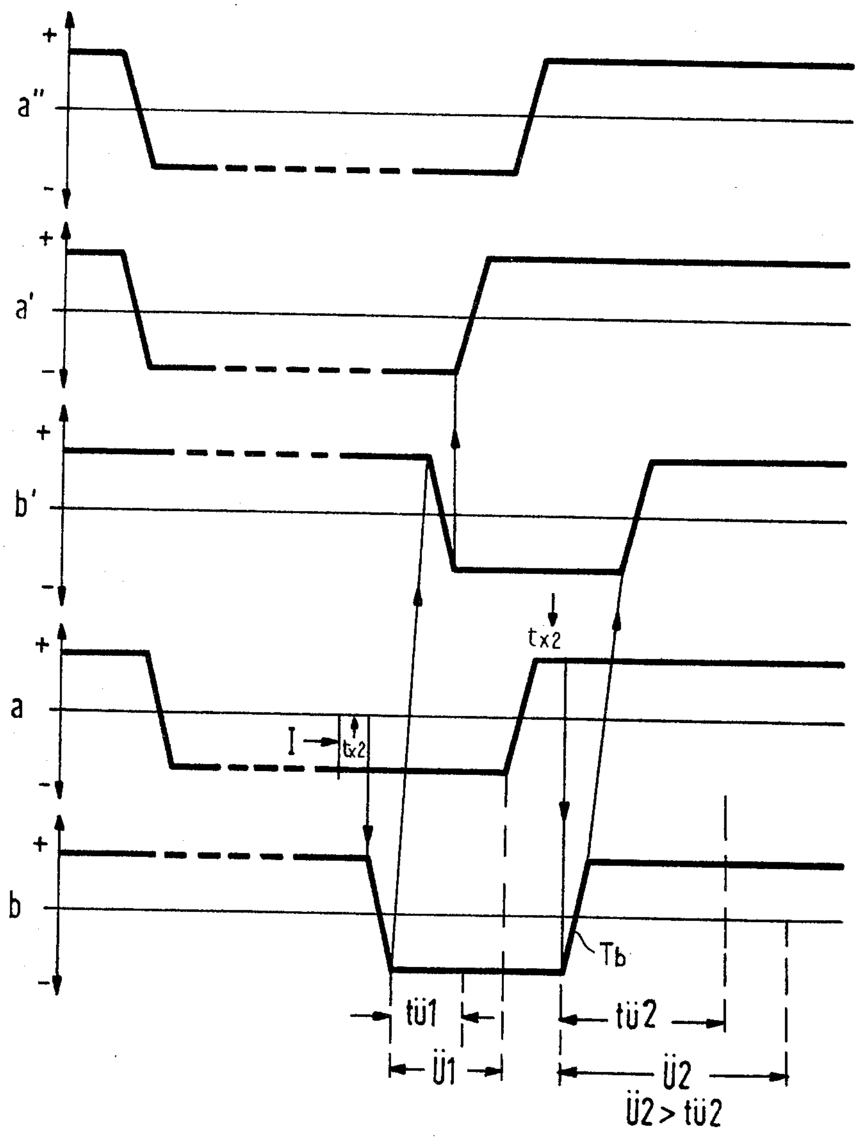
FIG. 7*b* is a series of graphs which explain the second of the two time criteria evaluated at the entry station to distinguish received clearing signals.

The graphs illustrated in FIGS. 7*a* and 7*b* show the signal conditions existing on transmission lines *a''* and *b''* of the subscriber station, connection lines *a'* and *b'* of the exchange office AA, and connection lines *a* and *b* of entry station ES. Assume that a subscriber completes clearing signal transmission, whereupon a stop polarity signal (+TB) is transmitted to transmission line *a''*, and thus to connection line *a'*, and then, after predetermined time delay *t*1 to connection line *a* of entry station ES, simultaneously with initiation of transmission of the start polarity (—TB) signal by entry station ES over line *b*, which occurs after entry station ES receives a stop polarity signal (+TB) for time period I that results in energization of relay X.

A stop polarity signal (+TB) received at entry station ES could than either be (1) an acknowledgement signal transmitted by exchange office AA upon transmission thereto of a start polarity signal (—TB) from entry station ES, or (2) a stop polarity signal (+TB) indicative of completion of clearing signal transmission by a subscriber station. The fact that the first (1) signal would be received after the second (2) signal, under the conditions described, is utilized to evaluate and distinguish the received signals, by introducing supervision time *tu*1, into the evaluation and supervision apparatus U at entry station ES, wherein *tu*1 comprises at least the sum of transmission times associated with signal transmission in both directions over at least one (*a'* or *b'*, for example) long distance communication line segment.

Therefore, if the time at which a stop polarity signal (+TB) received by entry station ES, is calculated with respect to the time at which a start polarity signal (—TB) is transmitted by entry station ES, an evaluation can be made to determine what the stop polarity signal (+TB) received by entry station ES indicates.

If the stop polarity signal (+TB) is received by entry station ES prior to the earliest theoretical time (considering time delays introduced by communication lines and the response time of various elements) at which an acknowledgment stop polarity pulse (—TB) transmitted by exchange office AA could be received by entry station ES, that is, within the time period (*I*+*tx*), wherein I is the response time of time evaluation switching device connected to relay X and *tx* is the response time of relay X, or prior to the elapse of time interval *tu*1, then it is evident that the stop polarity pulse (+TB) is not an acknowledgment signal transmitted by start exchange office AA, but rather is a stop polarity signal (+TB) transmitted by the subscriber station at the completion of clearing signal transmission. Thus, if a stop polarity pulse (+TB) is received by entry station ES within the time period (*I*+*tx*), it could not be an acknowledgment stop polarity pulse (+TB) from exchange office AA. This is illustrated in FIG. 7*a*, Graph *a*.

FIG. 7*a*, illustrates a series of graphs, illustrating the potential conditions existing on lines *a''*, *a'*, *b'*, *a*, and *b* with respect to the same time scale. Thus, if the leading edge L*a* of the stop polarity pulse (+TB) present on line *a*, calculated with respect to the leading edge L*b* of the start polarity pulse (—TB) present on line *b*, is received by entry station ES prior to the earliest theoretical time at which the leading edge of a stop polarity (+TB) acknowledgment pulse transmitted by exchange office AA can be received, this is indicative that the stop polarity pulse (+TB) is not an acknowldgment signal, but was transmitted by the subscriber at completion of clearing signal transmission.

With reference to graphs *a* and *b* of FIG. 7*a*, it is seen that the leading edge L*a* of the stop polarity pulse (+TB) present at connection line *a*, is received by entry station ES at time U1 after the leading edge L*b* of the start polarity pulse (—TB) present on line *b*, and that time period U1 is therefore less than *tu*1 ($U1 < tu1$). Therefore, it can definitely be determined that the stop polarity signal (+TB) received by entry station ES, is not an acknowledgment signal from exchange office AA, but is instead a stop polarity signal (+TB) transmitted by the subscriber upon the completion of clearing signal transmission. Further, if the stop polarity pulse (+TB) is received by entry station ES during time period (I+*tx*), that is, prior to actuation of relay X and thereby the actuation of contact *x*1 to its connection with —TB, it could not be an acknowledgment signal transmitted by exchange office AA, because such an acknowledgment signal is transmitted only in response to reception by exchange office AA of a start polarity signal (—TB) transmitted by entry station ES. Therefore, a stop polarity signal (+TB) received by entry station ES within time period (I+*tx*) would be indicative of completion of clearing signal transmission by the subscriber.

If a subscriber completes transmission of a clearing signal during the time that an acknowledgment stop polarity pulse (+TB) is being transmitted by exchange office AA, the stop polarity signal (+TB) then transmitted by the calling subscriber will coincidently be received by entry station ES with the acknowledgment stop polarity pulse (+TB) transmitted by exchange office AA. A second supervision time period, *tu*2, is therefore introduced that is greater than twice the signal transmission time associated with the longest length of the existing connection.

With reference to FIG. 7*b*, the graphs illustrate the potential conditions at lines *a''*, *a'*, *b'*, *a*, and *b*. Supervision time period *tu*2 represents the maximum time that may elapse between transmission of a stop polarity signal (+TB) from entry station ES to exchange office AA (which results when a stop polarity signal (+TB) is received by entry station ES that deenergizes relay X and actuates ocntact *x*1 to complete the through connection between lines *b* and *b'*) and reception by entry station ES of a start polarity pulse (—TB) transmitted by exchange office AA indicative of an acknowledgment signal therefrom. If the trailing edge of the stop polarity pulse (+TB) at connection line *a* is not received by entry station ES prior to the latest theoretical time (*tu*2) that the trailing edge of an acknowledgment stop polarity pulse (+TB) can be received, the received stop polarity signal (+TB) is recognized as an indication of completion of clearing signal transmission by the subscriber. Thus, with reference to FIG. 7*b*, Graphs *a* and *b*, the trailing edge T*a* of the stop polarity signal (+TB) present at line *a* is not illustrated as having been received by entry station ES before theoretical time period *tu*2 has elapsed relative to the trailing edge T*b* of the start polarity signal (—TB) transmitted by entry station ES. Thus, it may be received at time U2, wherein U2 is greater than *tu*2 ($U2>tu2$), and this is indicative of completion of clearing signal transmission.

Supervision switching device U thus evaluates the signals received by entry stations ES relative to the two criteria described above (with respect to time periods *tu*1 and *tu*2), and initiates connection of an entry station only when a clearing signal is evaluated as requesting entry of its particular associated entry station into the existing connection. Only if the subscriber accidentally generates a stop polarity (+TB) either less than or equal to the time duration of the stop polarity (+TB) acknowledgment pulses produced by exchange office AA would the described entry recognition criteria misfunction. Although, such accidental transmissions would be unlikely, as a precautionary measure, supervision switching device U may function to initiate connection of entry station ES to the existing connection only after several regular acknowledgment pulses are transmitted by office exchange AA and received by entry station ES, and are evaluated as such by supervision switching device U. Further, time period I associated with particular entry stations may be variable in accordance with the particular location of the entry station which determines time delay *t*1, such that settable clearing signal termination may be used to provide entry signal criteria to effect connection of only the selected entry station to the existing connection.

As explained with reference to FIGS. 1 and 2, supervision switching device U may also initiate release of an existing connection between a calling subscriber and a called subscriber, by connecting lines *a* and *b* through, instead of intercepting the release signal. It is also possible to limit clearing signal transmission in order to recognize breaks in the connection, or an absolute release order from a subscriber. The clearing signal transmission time may thus be limited to a predetermined time period, which when exceeded, is evaluated and effects connection release.

Figure 8:
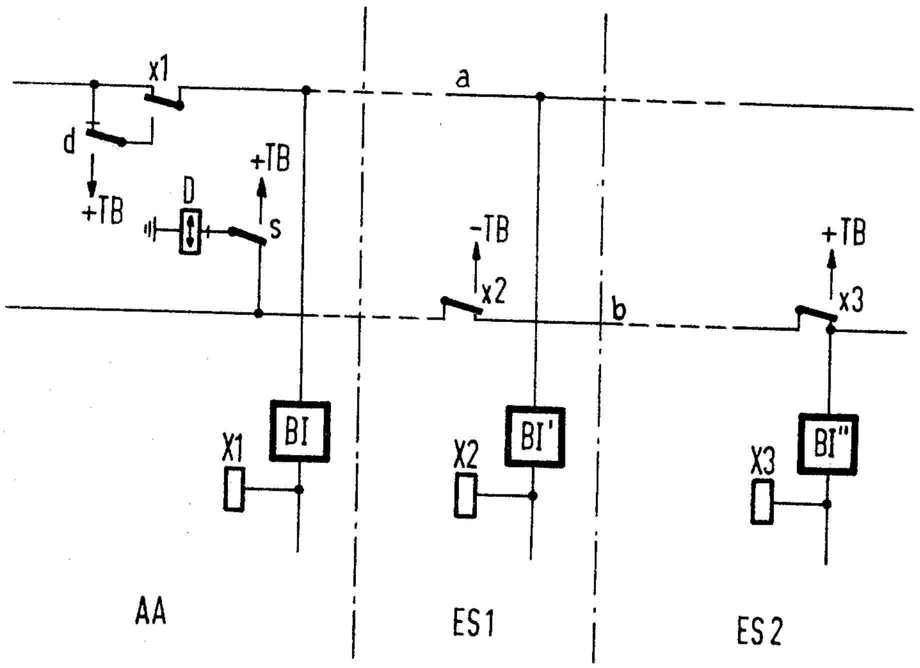
FIG. 8 is an electrical schematic circuit showing entry stations connectable to both lines of an existing connection.

The invention permits connection of entry stations not only to connection lines *a* or *b*, but also provides for the connection of different entry stations to lines *a* and *b*. FIG. 8 illustrates such an arrangement, that employs components similar to that described in relation to FIGS. 3 and 5. Thus, entry station ES1 may be connectable to line *a*, and entry station ES2 may be connectable to line *b*. Unfavorable time tolerances introduced by the circuit components that may erroneously effect release of the connection upon simultaneous transmission of a clearing signal by both subscribers (not shown) although intended as entry criterion, may be avoided by connecting entry station ES2 before entry station ES1. Such erroneous release of the existing connection may also be avoided by providing apparatus wherein entry station ES1 transmits a relatively short stop polarity pulse (+TB) to line *a* in reverse direction relative to the direction arrow indicated, after the first (I) clearing signal period of a clearing signal transmitted by the calling subscriber, and prior to transmission of the start polarity (—TB) signal.

Thus, the arrangement illustrated in FIG. 8 is similar to that shown in FIG. 5, except that an additional entry station ES2 is connectable to connection line *b*. Entry station ES2 comprises relay X3 connected with switching evaluation device B'', the latter being connected to connection line *b*. Connect *x*3 is actuated in response to energization of relay X3 to connect line *b* to stop polarity source (+TB). Then, as explained with reference to FIG. 1, it is a relatively simple process to connect entry station ES2 to the existing connection.

It is therefore seen that the disclosed invention provides for utilization of available clearing signals to develop entry signal criteria to effect the connection of additional stations to an existing connection between the calling and called stations of a teletypewriter apparatus. Further, it may readily be used in other type systems wherein a connection exists between two stations, to connect additional stations or other apparatus thereto, if a control signal is available that may function similarly to the clearing signal described above.

What is claimed is:

1. In a communication system having a connection (*a*, *b*) for signal transmission between a first station (T1) and a second station (T2) wherein the first (T1) and second stations (T2) may selectively transmit conventional clearing signals (ST), additional stations (ES) selectively connectable to the connection, each comprising:

a first relay (X), a first time evaluation switching device (BI) connected to the connection and responsive to the application of a clearing signal during a first predetermined time interval to the connection to cause the first relay to be energized, a second relay (Y), a second time evaluation switching device (BII) to the connection and responsive to the application of a clearing signal to the connection during a second predetermined time interval, to cause the second relay to be energized, maintaining means having a potential source (+TB), the first relay (X) having a first contact (*x*) operative in response to energization of the first relay to interrupt the connection and apply the potential source (+TB) thereto for the duration of application of the clearing signal to cause the connection not to be permanently broken, the second relay (Y) having a second contact (*y*) operative to connect an entry signal to the additional station selected to be connected to the connection in response evaluation of a clearing signal during the second predetermined time interval.

2. The communication system recited in claim 1 wherein the evaluation switching devices (BI, BII) evaluate clearing signals (ST) for limited portions (I, II) of the time duration thereof.

3. The communication system recited in claim 1 wherein the communication system comprises a teletypewriter system wherein the first station (T1) is the calling station and the second station (T2) is the called station.

4. The communication system recited in claim 3 wherein said connection comprises a first connection line (*a*)

for signal transmission from said calling station (T1) to said called station (T2) and a second connection line (*b*) for signal transmission from said called station (T2) to said calling station (T1), connected between the calling station (T1) and the called station (T2).

5. The communication system recited in claim 4 wherein the first and second evaluation switching devices (BI, BII) are connected to the first connection line (*a*).

6. The communication system recited in claim 5 wherein the communication system comprises a teletypewriter system, a starting exchange office (AA) associated with the calling station (T1) connected between the calling station (T1) and the called station (T2) having first switching means (S; D) actuated in response to a request from either the calling station (T1) or the called station (T2) that an additional station be added to the connection such that the calling station (T1) is maintained connected to the starting exchange office (AA) with transmission of a clearing signal.

7. The communication system recited in claim 5 wherein the communication system comprises a teletypewriter system and said connection comprises a local two-wire-connection, further comprising:

a starting exchange office (AA) associated with the calling station (T1) connected between calling station (T1) and called station (T2) having first switching means (S) responsive to a request signal from either the calling station (T1) or the called station (T2) that an additional station be added to the connection, to actuate a switch (*s*) such that the calling station (T1) is maintained connected to the starting exchange office (AA) with transmission of a clearing signal.

8. The communication system recited in claim 5 wherein the clearing signal (ST) comprises first (I) and second (II) portions and the first time evaluation switching devices (BI) connected to the first connection line (*a*) evaluate the first portion (I) of clearing signals, first switching means (X; *x*2) connected to said first time evaluation switching device (BI) responsive to an evaluation of the first clearing signal portion (I) to interrupt the second connection line (*b*) and connect the connection point of said second connection line (*b*) and said calling station (T1) to the maintaining means (—TB) through the first contact (*x*1).

9. The communication system recited in claim 8 further comprising:

a starting exchange office (AA) associated with the calling station (T1) connected between calling station (T1) and called station (T2) having inversion means (*d*, *x*1, D; *x*1, B, A) to invert signals transmitted from the maintaining means to the starting exchange office (AA) and produce and transmit corresponding inverted acknowledgment signals to the called station (T2) over the first connection line (*a*).

10. The communication system recited in claim 9 wherein the evaluation switching devices further comprise supervision switching means (U) responsive to clearing signals exceeding a third predetermined time duration to effect release of the connection.

11. The communication system recited in claim 9 further comprising supervision means (U) responsive to successive acknowledgment signals exceeding a predetermined number to initiate release of the connection.

12. The communication system recited in claim 1 further comprising supervision switching means (U) responsive to clearing signals exceeding a third predetermined time duration to effect release of the connection.

13. The communication system recited in claim 4 wherein the second connection line (*b*) is connected to the first time evaluation switching device of the entry station responsive to the clearing signal during the associated first predetermined time interval, the associated first contact (*x*) operating to connect the second connection line to the potential source (+TB).

References Cited

UNITED STATES PATENTS

| | | | |
|---|---|---|---|
| 2,321,349 | 6/1943 | Anspach | 178—2.3 |
| 2,733,424 | 1/1956 | Chen. | |
| 3,251,929 | 5/1966 | Kafitz | 178—2 |

JOHN W. CALDWELL, Primary Examiner

M. M. CURTIS, Assistant Examiner

U.S. Cl. X.R.

178—3, 69.6

UNITED STATES PATENT OFFICE

CERTIFICATE OF CORRECTION

Patent No. 3,513,255 Dated May 19, 1970

Inventor(s) Henrik Muller

It is certified that error appears in the above-identified patent and that said Letters Patent are hereby corrected as shown below:

Column 7, line 73, change "than" to --then--

Column 9, line 15, change "ocntact" to --contact--

Column 10, Claim 1, line 52, after "time interval," insert --longer than the first predetermined time interval,--

Signed and Sealed this

*Twenty-seventh* Day of *December 1977*

[SEAL]

*Attest:*

RUTH C. MASON
*Attesting Officer*

LUTRELLE F. PARKER
*Acting Commissioner of Patents and Trademarks*